United States Patent

Figueroa

[15] 3,679,884
[45] July 25, 1972

[54] MATHEMATIC ROOT COMPUTER

[72] Inventor: David R. Figueroa, Dade County, Fla.
[73] Assignee: Coulter Electronics, Inc., Hialeah, Fla.
[22] Filed: April 13, 1970
[21] Appl. No.: 27,860

[52] U.S. Cl. ..........................................235/193.5, 328/144
[51] Int. Cl. ..........................................G06g 7/20
[58] Field of Search ...................235/193.5, 183; 328/144

[56] References Cited

UNITED STATES PATENTS

| | | | |
|---|---|---|---|
| 3,043,516 | 7/1962 | Abbott et al. | 235/193 X |
| 3,383,501 | 5/1968 | Patchell | 235/183 X |
| 3,521,046 | 7/1970 | Tippetts | 235/183 X |

Primary Examiner—Eugene G. Botz
Attorney—Silverman & Cass

[57] ABSTRACT

Apparatus for electronically determining the mathematic root of a given value, comprising in series a plurality of integrators, a comparator, and a control circuit. A reference voltage is applied to the input of the first integrator and elicits an output from the last integrator, which output is compared by the comparator with an input voltage that reflects the value to be rooted. When the two compared voltages are equal, the control circuits undergoes a change of state, at which time the output voltage of the first integrator is a mathematic root of the given input value. The order of the root attained at the first integrator depends upon the number of integrators in the series; i.e., a series of three integrators will cause the output from the first integrator to be the cube root value of the input voltage. Moreover, other roots can be obtained from the output of the intermediate integrators.

5 Claims, 1 Drawing Figure

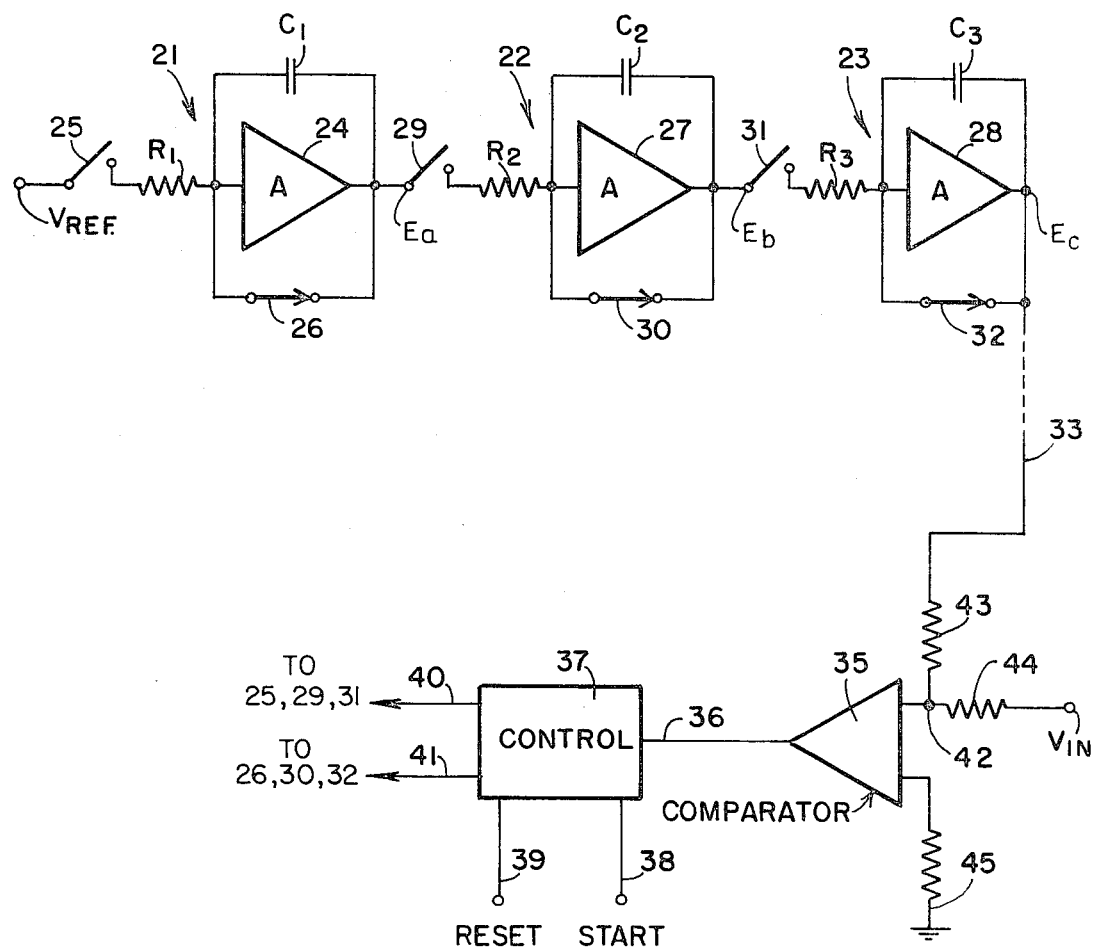
Inventor
DAVID R. FIGUEROA
BY
Silverman & Cass
ATTYS.

MATHEMATIC ROOT COMPUTER

BACKGROUND OF THE INVENTION

The invention relates to electrical apparatus for determining the mathematic root value of a given magnitude and, more particularly, the cube root value thereof.

In many areas of technology it is desirable to have a fast, inexpensive and proficient way to find the mathematic root of a given magnitude. In the field of computers, methods have been devised to find the square root of magnitudes. It is, however, believed that no methods have so far been developed for determining the cube root or roots of a higher order of a given value.

Cube roots are of high practical significance in the fields of particle studies. In such fields, dealing with particles of industrial, chemical or biological nature, such as for instance in the study of blood particles, apparatus and methods have been developed for determining particle sizes in terms of their volumes. Assuming for example, that such a particle is of the type of spheric body, and that it is of interest to know the diameter of such spheric body, a simple way of finding the diameter would be to cube root the numerical figure representing the volume.

In other fields of science and even in that of pure mathematics it is often desirable to find quickly and reliably roots of an order even higher than the third order such as the fourth, fifth order etc., as well as the square root.

It is believed that electronic means so far have not been provided by the prior art for a speedy determination of roots of an order exceeding square roots.

SUMMARY OF THE INVENTION

Accordingly, it is an object of this invention to overcome the deficiencies of the prior art by providing method and apparatus for the electronic determination of mathematic roots of any order.

It is a further object of the invention to provide a specific arrangement whereby the cube root of a given value is readily determined.

The invention is predicated on the idea that a reference voltage can be integrated in an electronic integrator and elicit an output response which increases with time. If such reference voltage is applied to a plurality of series connected integrators, the output response from each successive integrator will be a more steeply ascending curve than that of the integrator feeding into it.

If there is a series of three, or four, or five, etc. integrators, then by comparing the output of the last of the series with a given value, there will result at the output of the first integrator, respectively, the third, fourth, fifth, etc. root of the given value. Other root values can be obtained from the output of the intermediate integrators.

A preferred embodiment is described for the case of cube-rooting a given value by using three series connected integrators, a comparator and control circuit. A reference voltage is sent through the three integrators and the integrated output of the third integrator is compared with a voltage constituting a value to be cube-rooted. Thereupon, such cube root is the output voltage of the first integrator.

BRIEF DESCRIPTION OF THE DRAWING

The FIGURE is an electric schematic of the preferred embodiment.

DESCRIPTION OF THE PREFERRED EMBODIMENT

Referring to the single figure which is a schematic illustration of the subject circuit and shows a preferred embodiment of the invention, it is readily noted that three integrators 21, 22 and 23 are series-connected. The first integrator 21 comprises the series connection of a resistor $R_1$ and a condenser $C_1$ as well as an amplifier 24 in parallel with the condenser $C_1$. A switch 25 is connected in series with the input to the first integrator 21 and hereinafter will be referred to as the input control switch 25. Also in parallel to the amplifier 24 is a switch 26 which will be referred to as the parallel switch 26.

The second and third integrators 22 and 23 have elements and connections corresponding to those of the first integrator 21, specifically: a resistor $R_2$, a condenser $C_2$, and an amplifier 27; a resistor $R_3$, a condenser $C_3$, and amplifier 28. Likewise, the integrator 22 is provided with an input control switch 29 and a parallel switch 30; whereas, the integrator 23 is provided with an input control switch 31 and a parallel switch 32.

The output of the third integrator 23 is fed over a line 33 to one input of a comparator 35. The output of the comparator 35 is coupled by a line 36 to one input of control circuitry 37. A start input line 38 and a reset input line 39 also are coupled to the control circuitry 37. The logic condition of these latter two input lines can be operator-regulated as well as automatically regulated. Output from the control circuitry is applied to a pair of lines 40 and 41, with the line 40 determining the condition of the input control switches 25, 29 and 31, and the output on the line 41 determining the condition of the parallel switches 26, 30 and 32.

A voltage summing junction 42 is at one input of the comparator 35 and is connected to a resistor 43 in the output line 33 from third integrator 23. Also coupled to the summing junction is a resistor 44 which receives its input from a source $V_{in}$, which is the value to be cube rooted. It is to be assumed that the voltages at the resistors 43 and 44 are of opposite polarity and thereby, when equal, provide a null voltage at the junction 42.

The other input 45 to the comparator is grounded. It will be appreciated that, in the alternative, the resistors 43 and 44 could be coupled to the respectively different inputs to the comparator 35. In both modes of coupling, the attainment of specific voltages (typically equal voltages) at the resistors 43 and 44 will cause the comparator to produce a characteristic output on the line 36 to activate the control circuitry 37, as will be discussed next.

A reference voltage $V_{ref}$ is supplied to the first switch 25.

Other voltages of significance are:

$E_a$ at the output of the first integrator 21;
$E_b$ at the output of the second integrator 22; and
$E_c$ at the output of the third integrator 23.

In operation, the reference voltage, preferably a fixed d.c. voltage, is applied to the first input control switch 25, which normally is open, as are the other input control switches 29 and 31; whereas, the parallel switches 26, 30 and 32 normally are closed.

When the voltage $V_{in}$, which is the quantum input representing a magnitude that is to be cube-rooted, is ready to be applied to the null junction 42, the start command is given on the line 38, whereby the input control switches 25, 29 and 31 are closed, and simultaneously the parallel switches 26, 30 and 32 are opened, all at the same time. The closing of the input switches 25, 29 and 31 has the effect that all three integrators 21, 22, 23 are charged by the value $V_{ref}$ and produce varying output responses, i.e. each shows an ascending output response curve representing a voltage as a function of time. More particularly, the output curve of the first integrator 21 is simply an ascending straight line or ramp voltage. The second integrator 22, since it is integrating a ramp voltage, generates an output that is ascending somewhat faster than the straight line of the first curve, being in the nature of a function of the second power. The output response curve of the third integrator 23 has a still steeper ascending character, being a function of the third power.

At the moment when $E_c$, the output voltage of the third integrator 23, reaches the level of $V_{in}$ as seen at the null junction 42, the output voltage of the comparator 35 changes state and causes the input control switches 25, 29 and 31 to open simultaneously. At this moment of time $E_a$, the output voltage of the first integrator 21, is:

$$(1) \quad E_a = k \sqrt[3]{V_{in}},$$

wherein $k$ is an appropriate scale factor, as explained in detail hereinafter, and the value of $E_a$ is available for recording. Thereafter, the reset command is actuated over the line 39, causing the parallel switches 26, 30, 32 to close, the condensers $C_1$, $C_2$, $C_3$ to discharge, and the return of the system to its original state.

The above noted equation for $E_a$ is derived in the following way:

$$E_a = V_{ref} \cdot \frac{1}{R_1 C_1} \int_{t_0}^{t_s} t \cdot dt = V_{ref} \frac{t_s}{R_1 C_1} = k_1 \cdot t_s, \quad (2)$$

wherein $k_1 = (V_{ref})/(R_1 C_1)$, and $t_s$ equals the time when the comparator changes state. From (2) it follows that $$(3) \quad t_s = (E_a)/(k_1).$$

Since $V_{ref}$, $R_1$ and $C_1$ are constants, $k_1$ necessarily is constant, and the curve for $E_a$ as a function of $t$ is an ascending straight line as noted heretofore.

The voltage at the output of the second integrator 22 is correspondingly:

$$E_b = \frac{V_{ref} \cdot t_s^2}{2 R_1 C_1 R_2 C_2} = k_2 \cdot t_s^2, \quad (4)$$

wherein $$k_2 = \frac{V_{ref}}{2 R_1 C_1 R_2 C_2}.$$

Finally, the voltage at the output of the third integrator 23 is:

$$E_c = \frac{V_{ref} \cdot t_s^3}{6 R_1 C_1 R_2 C_2 R_3 C_3} = k_3 \cdot t_s^3, \quad (5)$$

wherein $$k_3 = \frac{V_{ref}}{6 R_1 C_1 R_2 C_2 R_3 C_3}.$$

As stated heretofore, the change of state by the comparator occurs when $E_c = V_{in}$, and therefore we may say:

$$(6) \quad V_{in} = k_3 \cdot t_s^3.$$

Since $t_s = (E_a)/(k_1)$, as set forth above in equation (3), it follows that:

(7) $V_{in} = k_3 (E_a^3)/(k_1^3)$ and $E_a^3 = (V_{in} \cdot k_1^3)/(k_3)$ and therefore, $$E_a = k_1 \sqrt[3]{\frac{V_{in}}{k_3}} = \sqrt[3]{\frac{k_1^3}{k_3}} \cdot V_{in} \quad (8)$$

or $$E_a = \sqrt[3]{\frac{k_1^3}{k_3}} \cdot \sqrt[3]{V_{in}}.$$

If $k$ is defined as $$k = \sqrt[3]{\frac{k_1^3}{k_3}} \text{ there can be derived } E_a = k \sqrt[3]{V_{in}}, \quad (9)$$

which equation is identical with the equation (1) set forth heretofore.

Since $k$ is a pure number depending on pure numbers $k_1$ and $k_3$ which in turn depend on constants $V_{ref}$, $R_1 C_1 R_2 C_2 R_3 C_3$ it is obvious that $k$ may easily be determined as a scale factor, and $E_a$ is readily found as the cube-root of $V_{in}$, which is the object of this invention.

Also within the teachings of this invention, as will be appreciated from the foregoing is the fact that:

$E_b$ also is equal to $k(\sqrt[3]{V_{in}})^2 = k(V_{in})^{2/3}$. (10)

Accordingly, if there were four series connected integrators, with the fourth integrator following the integrator 23, and its output being coupled to the line 33 (an arrangement not believed necessary to illustrate, except to show that the output line 33 is broken to be able to receive one or more additional integrators,) the output from the first integrator 21 would be:

$$E_a = k \sqrt[4]{V_{in}} \quad (11)$$

and the outputs from the second and third integrators 22 and 23 would be:

$$E_b = k(\sqrt[4]{V_{in}})^2 = k(V_{in})^{2/4} = k \sqrt{V_{in}} \quad (12)$$

and $$E_c = k(\sqrt[4]{V_{in}})^3 = k(V_{in})^{3/4}. \quad (13)$$

Likewise, if there were six series connected integrators, three integrators being added to those illustrated, and the output from the last being connected to the comparator:

$$E_a = k \sqrt[6]{V_{in}}; \quad (14)$$

$$E_b = k(\sqrt[6]{V_{in}})^2 = k(V_{in})^{2/6} = k \sqrt[3]{V_{in}}; \quad (15)$$

and $$E_c = k(\sqrt[6]{V_{in}})^3 = k(V_{in})^{3/6} = k\sqrt{V_{in}}. \quad (16)$$

Thus, it will be appreciated that any desired root value can be obtained, from the output from the first integrator 21 and, by proper choice of the number of integrators and the selection of outputs from intermediate integrators, "intermediate" root values obtained, such a square root and cube root from the integrators 22 and 23.

It is believed that those skilled in the art will recognize and be able to practice this invention from the foregoing and be able to adapt same to particular use and in particular environments without departing from the spirit of the invention or the scope thereof as defined in the following claims.

What is sought to be protected by United States Letters Patent is:

1. Electronic apparatus for automatically producing at least one predetermined root of an input quantum, said apparatus comprising:

a plurality of integrators connected in series, each integrator having an input and an output, an input control switch being series connected to the input of each integrator, the input of the first of said plurality of integrators arranged to receive a reference voltage, the number of said integrators equaling the highest order of root directly obtainable from an output from one of said integrators, comparing means arranged to receive as inputs the input quantum and the output from the last of said plurality of integrators and to produce a characteristic output when the magnitudes of these two inputs attain a predetermined relationship, a control circuit coupled to receive the characteristic output from said comparing means, said control circuit being arranged to be responsive to an externally supplied start command, and said control circuit having a first output coupled to control the operation of said input control switches in separate response to said characteristic input from said comparing means and to a start command, whereupon, when said comparing means produces its characteristic output, the output from said first integrator demarcates said predetermined root of the input quantum.

2. Apparatus as set forth in claim 1 wherein the total number of series connected integrators is three, and the comparing means is arranged to receive as an input the output from the third integrator, whereby the output from the first integrator demarcates the cube root of the input quantum when the comparing means produces its characteristic output.

3. Apparatus as set forth in claim 1 wherein second reset switch means are parallel coupled to each integrator switch,
   said control circuit is arranged to be responsive to an externally supplied reset command, and
   said control circuit has a second output coupled to control the operation of said reset switches in response to a reset command.

4. Apparatus as set forth in claim 2 wherein second reset switch gate means are parallel coupled to each integrator,
   said control circuit is arranged to be responsive to an externally supplied reset command, and
   said control circuit has a second output coupled to control the operation of said reset switches in response to a reset command.

5. Apparatus as set forth in claim 2 wherein said comparing means comprises
   a comparator having an input summing junction coupled to receive the output from the last integrator and the input quantum.

* * * * *